US012677831B2

(12) United States Patent
Mundhra et al.

(10) Patent No.: US 12,677,831 B2
(45) Date of Patent: Jul. 14, 2026

(54) HERBICIDAL COMPOSITION COMPRISING OF PHENYLPYRAZOLINE AND TRIAZINONE COMPOUNDS

(71) Applicant: WILLOWOOD CHEMICALS LIMITED, New Delhi (IN)

(72) Inventors: Parikshit Mundhra, New Delhi (IN); Jitendra Mohan, New Delhi (IN)

(73) Assignee: WILLOWOOD CHEMICALS LIMITED, New Delhi (IN)

( * ) Notice: Subject to any disclaimer, the term of this patent is extended or adjusted under 35 U.S.C. 154(b) by 471 days.

(21) Appl. No.: 18/278,590

(22) PCT Filed: Feb. 24, 2022

(86) PCT No.: PCT/IN2022/050161
§ 371 (c)(1),
(2) Date: Aug. 23, 2023

(87) PCT Pub. No.: WO2022/180645
PCT Pub. Date: Sep. 1, 2022

(65) Prior Publication Data

US 2024/0225001 A1 Jul. 11, 2024

(30) Foreign Application Priority Data

Feb. 26, 2021 (IN) ............................. 202111008241

(51) Int. Cl.

| | |
|---|---|
| ***A01N 43/707*** | (2006.01) |
| ***A01N 25/14*** | (2006.01) |
| ***A01N 43/90*** | (2006.01) |
| ***A01N 47/30*** | (2006.01) |
| ***A01N 47/36*** | (2006.01) |
| ***A01P 13/02*** | (2006.01) |

(52) U.S. Cl.
CPC ........... *A01N 43/707* (2013.01); *A01N 25/14* (2013.01); *A01N 43/90* (2013.01); *A01N 47/30* (2013.01); *A01N 47/36* (2013.01); *A01P 13/02* (2021.08)

(58) Field of Classification Search
None
See application file for complete search history.

(56) References Cited

FOREIGN PATENT DOCUMENTS

| | | | |
|---|---|---|---|
| CN | 105284846 A | 2/2016 | |
| EP | 2700635 A1 | 2/2014 | |
| WO | WO-2012/053652 A1 | 4/2012 | |
| WO | WO-2012123408 A1 | 9/2012 | |
| WO | WO-2015078243 A1 * | 6/2015 | ............. A01N 47/36 |
| WO | WO-2019150233 A1 | 8/2019 | |

OTHER PUBLICATIONS

International Search Report from Corresponding PCT Application No. PCT/IN2022/050167 dated May 26, 2022.
Written Opinion of the International Searching Authority from Corresponding PCT Application No. PCT/IN2022/050167 dated May 26, 2022.
Pawan Katara et al., (2015) “Influence of pinoxaden in combination with other herbicides on nutrient depletion by weeds in wheat”, Indian Journal of Weed Science, 47(4) :371-375.
International Search Report from corresponding PCT Application PCT/IN2022/050161, dated May 13, 2022.
Written Opinion from corresponding PCT Application No. PCT/IN2022/050161, dated May 13, 2022.

* cited by examiner

*Primary Examiner* — John Pak
(74) *Attorney, Agent, or Firm* — Harness Dickey & Pierce P.L.C.

(57) ABSTRACT

The present invention provides a synergistic herbicidal composition comprising of phenylpyrazoline class of herbicide such as Pinoxaden, Triazinone class of herbicide such as Metribuzin and at least one herbicidal compound is selected from Isoproturon or Metsulfuron-methyl.

8 Claims, No Drawings

HERBICIDAL COMPOSITION COMPRISING OF PHENYLPYRAZOLINE AND TRIAZINONE COMPOUNDS

PRIORITY STATEMENT

This application is a national stage application under 35 U.S.C. § 371 of PCT International Application No. PCT/IN2022/050161, which has an international filing date of 24 Feb. 2022 and claims priority under 35 U.S.C. § 119 to India patent application No. 202111008241 filed on 26 Feb. 2021. The contents of each application recited above are incorporated herein by reference in their entirety.

FIELD OF THE INVENTION

The present invention relates to a synergistic herbicidal composition comprising of phenylpyrazoline class of herbicide such as Pinoxaden, Triazinone class of herbicide such as Metribuzin and at least one herbicidal compound selected from Isoproturon or Metsulfuron-methyl.

BACKGROUND OF THE INVENTION

The crop protection from weeds and other vegetation which inhibit crop growth is a constantly recurring problem in agriculture. Therefore, the control of weeds or unwanted plants is important for the crop productivity and economics. Researchers in the field of agro chemistry have designed many chemicals and chemical formulations in single or in combination of active ingredients for the control of such weeds or unwanted plants. A large number of chemical herbicides have been disclosed in the literature and many are used commercially. However over the time weeds and other undesired vegetation develops the resistance against the herbicides or the combination thereof.

For instance, *Phalaris minor*, a weed of irrigated wheat has developed resistance against most of the available herbicidal chemicals. In order to reduce the risk from increased number of herbicide resistant strains, mixtures of different active compounds are nowadays employed for controlling weeds or unwanted plants. By combining different active compounds having different mechanisms of action, it is possible to ensure efficient control of wide spectrum of weeds over a relatively longer period of time and preventing development of resistance. However, this requires the continuous research and development of an effective composition with different active compounds, so as to avoid selection to the particular mechanism of action.

Therefore, there exist a need in the art to develop an herbicidal composition, which is stable, synergistic, broad spectrum, environmentally safe, and more effective in control of weeds in crops. The herbicidal compositions must show a broader scope of activity to avoid or to prevent the development of resistant varieties of weeds to the active ingredients or to the mixtures of known active ingredients used by farmer while minimising the doses of chemicals sprayed in the agriculture fields.

As a solution to the above mentioned problems, the inventors of the present invention surprisingly found that composition comprising Pinoxaden, Metribuzin and at least one herbicidal compound selected from Isoproturon or Metsulfuron-methyl provides effective control of wide range of weeds or undesired plants.

SUMMARY OF THE INVENTION

Accordingly, the present invention provides a synergistic herbicidal composition comprising Pinoxaden, Metribuzin and at least one herbicidal compound selected from Isoproturon or Metsulfuron-methyl and one or more excipients.

In an embodiment, the composition of the present invention comprises of Pinoxaden in the range of 1 to 10% w/w; Metribuzin in the range of 5 to 20% w/w; at least one herbicide compound selected from Isoproturon or Metsulfuron methyl in the range of 0.1 to 60% w/w and one or more excipients.

In another embodiment, Isoproturon is preferably present in an amount 10 to 60% w/w, more preferably in an amount 25 to 60% w/w, most preferably in an amount 40 to 60% w/w. In one another embodiment, Metsulfuron methyl is preferably present in an amount 0.1 to 45% w/w, more preferably in an amount 0.1 to 10% w/w, most preferably in an amount 0.1 to 2% w/w.

In yet another embodiment, the composition of the present invention is selected from a group comprising:

Pinoxaden present in an amount 4.5% w/w, Metribuzin present in an amount 17.5% w/w and Isoproturon present in an amount 40% w/w and one or more excipients Pinoxaden present in an amount 4.5% w/w, Metribuzin present in an amount 17.5% w/w and Metsulfuron methyl present in an amount 0.4% w/w and one or more excipients.

In one another embodiment, the composition of the present invention is formulated as Capsule suspension (CS), Dispersible concentrate (DC), Dustable powder (DP), Powder for dry seed treatment (DS), Emulsifiable concentrate (EC), Emulsifiable granule (EG), Emulsion water-in-oil (EO), Emulsifiable powder (EP), Emulsion for seed treatment (ES), Emulsion oil-in-water (EW), Flowable concentrate for seed treatment (FS), Granules (GR), Micro-emulsion (ME), Oil-dispersion (OD), Oil miscible flowable concentrate (OF), Oil miscible liquid (OL), Oil dispersible powder (OP), Suspension concentrate (SC), Suspension concentrate for direct application (SD), Suspo-emulsion (SE), Water soluble granule (SG), Soluble concentrate (SL), Spreading oil (SO), Water soluble powder (SP), Water soluble tablet (ST), Ultra-low volume (ULV) suspension, Tablet (TB), Ultra-low volume (ULV) liquid, Water dispersible granules (WG), Wettable powder (WP), Water dispersible powder for slurry seed treatment (WS), Water dispersible tablet (WT), a mixed formulation of CS and SC (ZC) or a mixed formulation of CS and SE (ZE), a mixed formulation of CS and EW (ZW). In yet another embodiment, the composition is formulated as wettable powder (WP) and water dispersible granules (WG).

In an embodiment, the excipient used in the present invention is selected from the group comprising of dispersing agent, wetting agent, disintegrating agent, defoamer, and filler.

In another embodiment, the dispersing agent is selected from the group comprising sodium salt of naphthalene sulphonate condensate, sulfonated aromatic polymer sodium salt, sodium polycarboxylate, ethanesulfonic acid 2-[methyl [(9Z)-1-oxo-9-octadecenyl]amino]-sodium salt, sodium 2-(methyloeloyamino) ethane-1-sulphonate, amine salt of phosphate tristyryl phenol ethoxylated, acrylic copolymer, graft copolymer, salt of naphthalene sulphonate, naphthalene sulfonate formaldehyde condensate, phosphate ester, salt of polycarboxylate, alcohol block copolymer, ethoxylated polyarylphenol phosphate ester or a combination thereof, and present in an amount in the range from 1 to 10% w/w.

In one another embodiment, the wetting agent is selected from the group comprising sodium lauryl sulphate, sodium alkyl naphthalene sulfonate blend, sodium alkylnaphthalenesulfonate, sodium isopropyl naphthalene sulfonate, sodium dioctylsulfosuccinate, ethoxylated polyarylphenol phosphate ester, dioctyl sulphosuccinate, non-ionic ethoxylate or a combination thereof, and present in an amount in the range from 1 to 10% w/w.

In a further embodiment, the disintegrating agent is selected from the group comprising sodium sulphate, ammonium sulphate, sodium bicarbonate, lactose or a combination thereof, and present in an amount in the range from 1 to 10% w/w.

In a further embodiment, the defoamer is selected from the group comprising silicon emulsion, dimethyl polysiloxane emulsion, polysiloxane emulsion or a combination thereof and present in an amount in the range from 0.1 to 5% w/w.

In yet another embodiment, the filler is selected from the group comprising silica, china clay or a combination thereof. The filler is present in an amount of quantity sufficient to make 100% w/w formulation.

DETAILED DESCRIPTION OF THE INVENTION

The definitions provided herein for the terminologies used in the present disclosure are for illustrative purpose only and in no manner limit, the scope of the present invention disclosed in the present disclosure.

Unless defined otherwise, all technical and scientific terms used herein have the same meaning as commonly understood by one of ordinary skill in the art to which the invention pertains. Although other methods and materials similar, or equivalent, to those described herein can be used in the practice of the present invention, the preferred materials and methods are described herein.

As used herein, the term "composition" or "formulation" can be used interchangeably, unless stated otherwise, is meant to encompass, and are not limited to, compositions or formulations containing the combination of Pinoxaden, Metribuzin and at least one herbicidal compound selected from Isoproturon or Metsulfuron-methyl.

The expression of various quantities in terms of "% w/w" or "%" means the percentage by weight, relative to the weight of the total solution or composition unless otherwise specified.

The term "active ingredient" "(a.i.)" or "active agent" used herein refers to that component of the composition responsible for control of weeds or undesired plants.

As used herein, the term "Pinoxaden" encompasses its agrochemically acceptable salt(s), derivative(s) or any other modified form of Pinoxaden. Pinoxaden belongs to the class of phenylpyrazoline herbicide. It acts by inhibition of acetyl COA carboxylase.

As used herein, the term "Metribuzin" encompasses its agrochemically acceptable salt(s), derivative(s) or any other modified form of Metribuzin. Metribuzin belongs to the class of triazinone herbicide. It acts by inhibition of photosystem II.

As used herein, the term "Isoproturon" encompasses its agrochemically acceptable salt(s), derivative(s) or any other modified form of Isoproturon. Isoproturon belongs to the class of urea herbicide. It acts by inhibition of photosystem II.

As used herein, the term "Metsulfuron-methyl" encompasses its agrochemically acceptable salt(s), ester(s) such as Metsulfuron-methyl, derivative(s) or any other modified form of Metsulfuron-methyl. Metsulfuron-methyl belongs to the class of sulfonylurea herbicide. It acts by acetolactate synthase or acetohydroxyacid synthase inhibition.

The present invention provides a synergistic compositions of Pinoxaden, Metribuzin and at least one herbicidal compound selected from Isoproturon or Metsulfuron-methyl and one or more excipients.

It has been surprisingly found that composition comprising Pinoxaden, Metribuzin and at least one herbicidal compound selected from Isoproturon or Metsulfuron-methyl not only provides effective control of weeds or undesired plants but also such combination is synergistic in nature.

In an embodiment, the synergistic composition of the present invention comprises of Pinoxaden in the range of 1 to 10% w/w; Metribuzin in the range of 5 to 20% w/w; at least one herbicide compound selected from Isoproturon or Metsulfuron methyl in the range of 0.1 to 60% w/w and one or more excipients. In another embodiment, the composition comprises of Pinoxaden in the range of 1 to 10% w/w; Metribuzin in the range of 5 to 20% w/w and Isoproturon is preferably present in an amount 10 to 60% w/w, more preferably in an amount 25 to 60% w/w, most preferably in an amount 40 to 60% w/w. In one another embodiment, the composition comprises of Pinoxaden in the range of 1 to 10% w/w; Metribuzin in the range of 5 to 20% w/w and Metsulfuron methyl is preferably present in an amount 0.1 to 45% w/w, more preferably in an amount 0.1 to 10% w/w, most preferably in an amount 0.1 to 2% w/w.

In yet another embodiment, the synergistic composition of the present invention is selected from a group comprising:

Pinoxaden present in an amount 4.5% w/w, Metribuzin present in an amount 17.5% w/w and Isoproturon present in an amount 40% w/w and one or more excipients Pinoxaden present in an amount 4.5% w/w, Metribuzin present in an amount 17.5% w/w and Metsulfuron methyl present in an amount 0.4% w/w and one or more excipients.

In yet another embodiment, the composition of the present invention is formulated as Capsule suspension (CS), Dispersible concentrate (DC), Dustable powder (DP), Powder for dry seed treatment (DS), Emulsifiable concentrate (EC), Emulsifiable granule (EG), Emulsion water-in-oil (EO), Emulsifiable powder (EP), Emulsion for seed treatment (ES), Emulsion oil-in-water (EW), Flowable concentrate for seed treatment (FS), Granules (GR), Micro-emulsion (ME), Oil-dispersion (OD), Oil miscible flowable concentrate (OF), Oil miscible liquid (OL), Oil dispersible powder (OP), Suspension concentrate (SC), Suspension concentrate for direct application (SD), Suspo-emulsion (SE), Water soluble granule (SG), Soluble concentrate (SL), Spreading oil (SO), Water soluble powder (SP), Water soluble tablet (ST), Ultra-low volume (ULV) suspension, Tablet (TB), Ultra-low volume (ULV) liquid, Water dispersible granules (WG), Wettable powder (WP), Water dispersible powder for slurry seed treatment (WS), Water dispersible tablet (WT), a mixed formulation of CS and SC (ZC) or a mixed formulation of CS and SE (ZE), a mixed formulation of CS and EW (ZW). In a preferred embodiment, the composition of the present invention is formulated as WP and WG.

In an embodiment, the composition of the present invention comprises one or more excipients selected from dispersing agent, wetting agent, disintegrating agent, defoamer, filler and other excipients as will be required in a particular type of formulation.

It is generally observed that solid particles in a liquid undergo spontaneous aggregation to form lumps. Hence, it is recommended to add a dispersing agent/surfactant which prevents agglomeration of solid particles and keep them suspended in fluid. Accordingly, the composition of the present invention contains dispersing agent such as sodium salt of naphthalene sulphonate condensate, sulfonated aromatic polymer sodium salt, sodium polycarboxylate, ethanesulfonic acid 2-[methyl [(9Z)-1-oxo-9-octadecenyl] amino]-sodium salt, sodium 2-(methyloeloyamino) ethane-1-sulphonate, amine salt of phosphate tristyryl phenol ethoxylated, acrylic copolymer, graft copolymer, salt of naphthalene sulphonate, naphthalene sulfonate formaldehyde condensate, phosphate ester, salt of polycarboxylate, alcohol block copolymer, ethoxylated polyarylphenol phosphate ester. One or more dispersing agents may be used in the synergistic composition of the present invention. The dispersing agent is present in an amount in the range from 1 to 10% w/w.

Wetting is the first stage of dispersion, in which air surrounding the granular composition is substituted with water. Wetting of the composition with water cannot occur if the surface tension of the liquid is very high. Hence, it is recommended to add a wetting agent to the composition to facilitate the process of dispersion of the granules in the liquid. Non-limiting examples of wetting agents that can be used in the present invention include, but not limited to, sodium lauryl sulphate, sodium alkyl naphthalene sulfonate blend, sodium alkylnaphthalenesulfonate, sodium isopropyl naphthalene sulfonate, sodium dioctylsulfosuccinate, ethoxylated polyarylphenol phosphate ester, dioctyl sulphosuccinate, non-ionic ethoxylate. One or more wetting agents may be used in the synergistic composition of the present invention. The wetting agent is present in an amount in the range from 1 to 10% w/w.

Disintegrating agent is selected from the group comprising of sodium sulphate, ammonium sulphate, sodium bicarbonate, lactose or a combination thereof. The disintegrating agent is present in an amount in the range from 1 to 10% w/w.

A defoamer is generally added to the composition, as foam formation prevents the efficient filling of a container. Suitable defoamer used herein, but not limited to, polysiloxane, polydimethyl siloxane, organic fluorine compounds or a combination thereof and present in an amount in the range from 0.1 to 0.5% w/w.

A filler is added to the composition to improve the handling and storage characteristics of the composition. Fillers also add mass and/or volume to the active ingredient in order to facilitate precise measurement of the doses. Suitable fillers that may be used in the composition of the present invention include, but not limited to, bentonite clay, china clay, silica, kaolin and diatomaceous earth. The filler may be used in an amount of quantity sufficient to make 100% w/w formulation.

The composition of the present invention can be applied by any one of the methods selected from atomization, spreading, dusting, spraying, diffusion, immersion, irrigation, injection, mixing, sprinkling (water immersion), foaming, dressing, coating, blasting, fumigation, smoking, smog and painting.

In an embodiment, the present invention provides a process for the preparation of a WP formulation which comprises of a) mixing of dispersing agent, wetting agent, Pinoxaden, Metribuzin, at least one of Isoproturon or Metsulfuron methyl, defoamer and filler, b) milling the mixture of step a) in a suitable air jet mill and mixing homogeneously in a blender to obtain the formulation.

In another embodiment, the present invention provides a process for the preparation of a WG formulation which comprises of a) mixing of Pinoxaden, Metribuzin and at least one of Isoproturon or Metsulfuron methyl, dispersing agent, wetting agent, disintegrating agent, defoamer and filler in a blender, b) milling the mixture of step a) using a suitable air-jet mill, c) preparing dough of the milled mixture, d) extruding the dough using suitable extruder, e) drying the extruded granule.

In another embodiment, the composition of the present invention is effective in the management of post-emergence of monocotyledonous and dicotyledonous weeds. In an embodiment of the present invention, the composition used for the post-emergence control of variety of crops, including but not limited to, in cereals namely wheat, maize, sorghum, rice, barley, oats, triticale etc., soybeans, peanuts, cotton, onions, garlic, asparagus, sugarcane, ornamentals, rubber, as well as protecting crops from herbicidal injury caused by any of the individual components.

The rate of application amount varies depending on, for example, the blending ratio of active ingredients, meteorological condition, dosage form, application time, application method, application place, weed to be controlled, and target crop, in ordinary cases.

The synergistic composition of the present invention provides a number of other advantages:

- Increased efficacy in comparison to the other formulations tested during the trial.
- Economically beneficial to the farmers as it provides better yield of the crop with reduction in the number of sprays.
- Reduced possibility of hazards to the farmers due to occupational exposure because of reduction in the number of sprays.
- Is storage stable.
- Is non-phytotoxic.
- Environmental friendly.

The embodiments of the present invention are more particularly described in the following examples that are intended as illustrations only, since numerous modifications and variations within the scope of the present invention will be apparent to those of skill in the art. Unless otherwise noted, all parts, percentages and ratios reported in the following examples are on a weight basis and all excipients used in the examples were obtained or are available from the chemical suppliers.

EXAMPLES

The synergistic insecticidal composition of the present invention comprising Pinoxaden, Metribuzin and one of Isoproturon or Metsulfuron-methyl in WP and WG form is provided in example 1 to 10. The unit of each component of the composition are expressed in "% w/w" i.e. the percentage by weight, relative to the weight of the total solution or composition.

Examples 1 to 4

TABLE 1

Pinoxaden + Metribuzin + Isoproturon WP

| Sr. No. | Ingredients | Eg: 1 % w/w | Eg: 2 % w/w | Eg: 3 % w/w | Eg: 4 % w/w |
|---|---|---|---|---|---|
| 1 | Pinoxaden Technical (100% | 1 | 1 | 4.5 | 10 |

TABLE 1-continued

| Pinoxaden + Metribuzin + Isoproturon WP | | | | | |
|---|---|---|---|---|---|
| Sr. No. | Ingredients | Eg: 1 % w/w | Eg: 2 % w/w | Eg: 3 % w/w | Eg: 4 % w/w |
| | Basis) | | | | |
| 2 | Metribuzin Technical (100% Basis) | 5 | 20 | 17.5 | 5 |
| 3 | Isoproturon Technical (100% Basis) | 60 | 50 | 40 | 40 |
| 4 | Dispersing agent (sodium salt of naphthalene sulfonate condensate/ sulfonated aromatic polymer, sodium salt/ Sodium polycarboxylate/ Ethanesulfonic acid, 2-[methyl[(9Z)-1-oxo-9-octadecenyl]amino]-, sodium salt/Sodium 2-(methyloleoylamino)ethane-1-sulphonate) | 10 | 10 | 10 | 8 |
| 5 | Wetting Agent (sodium lauryl sulphate/sodium alkyl naphthalene sulfonate blend/sodium alkylnaphthalenesulfonate/ non-ionic derivative) | 5 | 5 | 5 | 4 |
| 6 | Defoamer (Dimethyl polysiloxane) | 0.4 | 0.4 | 0.2 | 0.2 |
| 7 | Filler (China clay/Silica) | Q.S. to make 100% | Q.S. to make 100% | Q.S. to make 100% | Q.S. to make 100% |
| | Total | 100 | 100 | 100 | 100 |

Q.S.: quantity sufficient required to make 100% w/w formulation

Process of Preparing Synergistic Wettable Powder Herbicidal Composition Comprising Pinoxaden, Metribuzin and Isoproturon Table 2 provides quantities of active ingredients and raw material charged to prepare the synergistic composition of the present invention in WP form. In table 2, active ingredients pinoxaden, metribuzin, isoproturon are in technical grade with 98%, 95% and 95% purity respectively. Particularly example 3 corresponds to column A in table 2.

TABLE 2

| Quantities of active ingredients and raw material charged | | | |
|---|---|---|---|
| Sr. No. | Ingredients | A Quantity (g) | |
| 1 | Pinoxaden Technical (98% Basis) | 4.60 | 4.60 |
| 2 | Metribuzin Technical (95% Basis) | 18.43 | 18.43 |
| 3 | Isoproturon Technical (95% Basis) | 42.11 | 42.11 |
| 4 | Sodium salt of naphthalene sulfonate condensate | 10.00 | — |
| 5 | Sodium polycarboxylate | — | 10.00 |
| 6 | Sodium alkyl naphthalene sulfonate blend | 5.00 | 5.00 |
| 7 | Dimethyl polysiloxane | 0.20 | 0.20 |
| 8 | China clay | 19.66 | 19.66 |
| | Total | 100.00 | 100.00 |

The ingredients were weighed and taken as per table 2. Sodium salt of naphthalene sulfonate condensate/sodium polycarboxylate, sodium alkyl naphthalene sulfonate blend, dimethyl polysiloxane and china clay were taken and stirred well with high shear mixer. To the mixture, Pinoxaden, Metribuzin and Isoproturon were added and premixed in a blender. The mixture was milled using air jet mill, until a mean particle size of below 10 microns was obtained. After milling, the mixture was mixed homogeneously by blender to obtain the title herbicidal composition in WP form.

Example 5 to 8

TABLE 3

| Pinoxaden + Metribuzin + Metsulfuron methyl WP | | | | | |
|---|---|---|---|---|---|
| Sr. No. | Ingredients | Eg: 5 % w/w | Eg: 6 % w/w | Eg: 7 % w/w | Eg: 8 % w/w |
| 1 | Pinoxaden Technical (100% Basis) | 1 | 1 | 4.5 | 10 |
| 2 | Metribuzin Technical (100% Basis) | 5 | 20 | 17.5 | 5 |
| 3 | Metsulfuron methyl Technical (100% Basis) | 2 | 0.1 | 0.4 | 0.4 |
| 4 | Dispersing agent (sodium salt of naphthalene sulfonate condensate/ sulfonated aromatic polymer, sodiumsalt/ Sodium polycarboxylate/ Ethanesulfonic acid, 2-[methyl[(9Z)-1-oxo-9-octadecenyl]amino]-, sodium salt/Sodium 2-(methyloleoylamino)ethane-1-sulphonate) | 8 | 8 | 10 | 8 |
| 5 | Wetting Agent (sodium lauryl sulphate/sodium alkyl naphthalene sulfonate blend/sodium alkylnaphthalenesulfonate/ non-ionic derivative) | 4 | 4 | 5 | 4 |
| 6 | Defoamer (Dimethyl polysiloxane) | 0.2 | 0.2 | 0.2 | 0.2 |
| 7 | Filler (China clay/Silica) | Q.S. to make 100% | Q.S. to make 100% | Q.S. to make 100% | Q.S. to make 100% |
| | Total | 100 | 100 | 100 | 100 |

Q.S.: quantity sufficient required to make 100% w/w formulation

Process of Preparing Synergistic Wettable Powder Herbicidal Composition Comprising Pinoxaden, Metribuzin and Metsulfuron Methyl Table 4 provides quantities of active ingredients and raw material charged to prepare the synergistic composition of the present invention in WP form. In table 4, active ingredients pinoxaden, metribuzin, metsulfuron methyl are in technical grade with 98%, 95% and 96% purity respectively. Particularly example 7 corresponds to column B in table 4.

TABLE 4

| Quantities of active ingredients and raw material charged | | |
|---|---|---|
| Sr. No. | Ingredients | B Quantity (g) |
| 1 | Pinoxaden Technical (98% Basis) | 4.60 |
| 2 | Metribuzin Technical (95% Basis) | 18.43 |
| 3 | Metsulfuron methyl Technical (96% Basis) | 0.42 |
| 4 | Sodium salt of naphthalene sulfonate condensate | 10.00 |
| 5 | Sodium alkyl naphthalene sulfonate blend | 5.00 |
| 6 | Dimethyl polysiloxane | 0.20 |
| 7 | China clay | 61.35 |
| | Total | 100.00 |

The ingredients were weighed and taken as per table 4. Sodium salt of naphthalene sulfonate condensate, sodium alkyl naphthalene sulfonate blend, dimethyl polysiloxane and china clay were taken and stirred well with high shear mixer. To the mixture, Pinoxaden, Metribuzin and Metsulfuron methyl were added and premixed in a blender. The mixture was milled using air jet mill until a mean particle size of below 10 microns was obtained. After milling, the mixture was mixed homogeneously by blender to obtain the title herbicidal composition in WP form.

TABLE 5

Pinoxaden + Metribuzin + Metsulfuron methyl WG

| Sr. No. | Ingredients | Eg: 9 % w/w | Eg: 10 % w/w | Eg: 11 % w/w | Eg: 12 % w/w |
|---|---|---|---|---|---|
| 1 | Pinoxaden Technical (100% Basis) | 1 | 1 | 4.5 | 10 |
| 2 | Metribuzin Technical (100% Basis) | 5 | 20 | 17.5 | 5 |
| 3 | Metsulfuron methyl Technical (100% Basis) | 2 | 0.1 | 0.4 | 0.4 |
| 4 | Dispersing agent (sodium salt of naphthalene sulfonate condensate/ sulfonated aromatic polymer, sodiumsalt/ Sodium polycarboxylate/ Ethanesulfonic acid, 2-[methyl[(9Z)-1-oxo-9-octadecenyl]amino]-, sodium salt/Sodium 2-(methyloleoylamino)ethane-1-sulphonate) | 10 | 8 | 8 | 8 |
| 5 | Wetting Agent (sodium lauryl sulphate/sodium alkyl naphthalene sulfonate blend/sodium alkylnaphthalenesulfonate/ non-ionic derivative) | 4 | 4 | 54 | 4 |
| 6 | Disintegrating Agent (sodium sulphate, ammonium sulphate, sodium bicarbonate, lactose) | 12 | 10 | 10 | 10 |
| 7 | Defoamer (Dimethyl polysiloxane) | 0.2 | 0.2 | 0.2 | 0.2 |
| 8 | Filler (China clay/Silica) | Q.S. to make 100% | Q.S. to make 100% | Q.S. to make 100% | Q.S. to make 100% |
| | Total | 100 | 100 | 100 | 100 |

Q.S.: quantity sufficient required to make 100% w/w formulation

Process of Preparing Synergistic Water Dispersible Granule Herbicidal Composition Comprising Pinoxaden, Metribuzin and Metsulfuron Methyl Table 6 provides quantities of active ingredients and raw material charged to prepare the synergistic composition of the present invention in WG form. In table 6, active ingredients pinoxaden, metribuzin, metsulfuron methyl are in technical grade with 98%, 95% and 96% purity respectively. Particularly example 11 corresponds to column C in table 6.

TABLE 6

Quantities of active ingredients and raw material charged

| Sr. No. | Ingredients | C Quantity (g) |
|---|---|---|
| 1 | Pinoxaden Technical (98% Basis) | 4.6 |
| 2 | Metribuzin Technical (95% Basis) | 18.42 |
| 3 | Metsulfuron methyl Technical (96% Basis) | 0.41 |
| 4 | Sodium salt of naphthalene sulfonate condensate | 8 |
| 5 | Sodium alkyl naphthalene sulfonate blend | 4 |
| 6 | Sodium sulphate | 10 |
| 7 | Dimethyl polysiloxane | 0.2 |
| 8 | China clay | 54.37 |
| | Total | 100.00 |

The ingredients were weighed and taken as per table 6. Sodium salt of naphthalene sulfonate condensate, sodium alkyl naphthalene sulfonate blend, sodium sulphate, dimethyl polysiloxane, china clay were taken and stirred well with high shear mixer. To the mixture, Pinoxaden, Metribuzin and Metsulfuron methyl were added and mixed in a ribbon blender type mixture. The mixture was milled by air jet mill until a mean particle size of below 10 microns was obtained. A dough was prepared using the milled mixture and 1% to 2% water in suitable dough mixer. The dough was then extruded using proper extruder having 0.8 mm size screen while maintaining the temperature of the screen below 45° C. and RPM of the extruder at about 20 to 25° C. to obtain extruded granules. The extruded granules were dried using a fluid bed dryer. The air flow was kept at 75% to 80% and temperature of the air was maintained at 47° C. to obtain the title herbicidal composition in WG form and sent to check for quality parameters.

Bio-Efficacy of the Herbicidal Composition of the Present Invention

Two experimental trials to evaluate the herbicidal composition of the present invention were conducted at different trial sites in Ghaziabad (U.P.) and Sonipat (Haryana) against grassy and broad leaved weeds of wheat crop (variety DARA in Ghaziabad and HD 2968 in Sonipat), which are prevalent in all wheat growing seasons with solo formulations, binary formulations and ternary formulations of the present invention as per the treatment details provided in Table 7 to Table 12.

The experiment was laid out in Randomized Block Design (RBD). The plot size was 10 m×10 m and the spacing was 20 cm×10 cm. All the recommended agronomic practices were followed throughout the cropping period. The different formulations were weighed according to the doses and diluted in water and applied using high volume knapsack sprayer fitted with a pressure regulator and a vertical bar with one flat fan nozzle at 30 days after sowing (DAS) at all locations and evaluated for % WCE (weed control efficiency) at 15, 30, 45 and 60 days after herbicide application (DAHA). 400 L/ha of water was used to dilute the recommended dose of formulation in all trials.

Weeds were collected from one square meter of each experimental plot and were cleaned and separated species wise. Weeds in different species were oven dried and then weight was taken separately. Weed control efficiency for individual species was calculated using the below formula:

$$\text{Weed control efficiency } (WCE\ \%) = \frac{\text{Weed population in control plot} - \text{weed population in treated plot}}{\text{Weed population in control plot}}$$

Plants from each experimental plot were harvested and grains were separated and weight of grains was taken. Thereafter weight was converted to yield into kg per hectare.

Details of Experiment:

TABLE 7

| Treatment Details: | | |
|---|---|---|
| S. No. | Treatments No. | Treatment Details |
| 1 | $T_1$ | Pinoxaden 4.5% + Metribuzin 17.5% + Metsulfuron-methyl 0.4% WP |
| 2 | $T_2$ | Pinoxaden 4.5% + Metribuzin 17.5% + Isoproturon 40% WP |
| 3 | $T_3$ | Pinoxaden 5.1% EC |
| 4 | $T_4$ | Metribuzin 70% WP |
| 5 | $T_5$ | Metsulfuron Methyl 20% WP |
| 6 | $T_6$ | Isoproturon 50% WP |
| 7 | $T_7$ | Pinoxaden 5.1% EC + Metribuzin 70% WP |
| 8 | $T_8$ | Pinoxaden 5.1% EC + Metsulfuron Methyl 20% WP |
| 9 | $T_9$ | Metribuzin 70% WP + Metsulfuron Methyl 20% WP |
| 10 | $T_{10}$ | Pinoxaden 5.1% EC + Isoproturon 50% WP |
| 11 | $T_{11}$ | Metribuzin 70% WP + Isoproturon 50% WP |
| 12 | $T_{12}$ | Control |

TABLE 8

Effect of treatment (Pinoxaden + Metribuzin + Metsulfuron-methyl/Isoproturon) on WCE against *Phalaris minor*

| S. | Treat- | Dose | | 15 DAHA | | | 30 DAHA | | | 45 DAHA | | | 60 DAHA | | |
|---|---|---|---|---|---|---|---|---|---|---|---|---|---|---|---|
| No. | ments | Formulation | a.i. | GZ | SP | PL | GZ | SP | PL | GZ | SP | PL | GZ | SP | PL |
| 1 | $T_1$ | 1000 g/ha | (45 + 175 + 4) g/ha | 88.45 | 87.56 | 88.01 | 89.41 | 87.99 | 88.70 | 90.35 | 89.02 | 89.69 | 91.11 | 89.90 | 90.50 |
| 2 | $T_2$ | 1000 g/ha | (45 + 175 + 400) g/ha | 92.43 | 91.50 | 91.97 | 93.43 | 91.95 | 92.69 | 94.42 | 93.02 | 93.72 | 95.22 | 93.94 | 94.58 |
| 3 | $T_3$ | 900 ml/ha | 45 g/ha | 56.67 | 57.94 | 57.30 | 58.63 | 57.49 | 58.06 | 59.56 | 58.36 | 58.96 | 56.81 | 58.17 | 57.49 |
| 4 | $T_4$ | 250 g/ha | 175 g/ha | 54.35 | 54.85 | 54.60 | 55.73 | 53.94 | 54.84 | 57.51 | 55.75 | 56.63 | 42.43 | 55.52 | 48.98 |
| 5 | $T_5$ | 20 g/ha | 4 g/ha | 17.37 | 17.41 | 17.39 | 17.60 | 17.25 | 17.42 | 17.87 | 17.51 | 17.69 | 17.41 | 17.49 | 17.45 |
| 6 | $T_6$ | 800 g/ha | 400 g/ha | 47.97 | 48.07 | 48.02 | 48.58 | 47.62 | 48.10 | 49.34 | 48.35 | 48.84 | 48.06 | 48.30 | 48.18 |
| 7 | $T_7$ | (900 ml + 250 g)/ha | (45 + 175) g/ha | 77.38 | 79.33 | 78.36 | 77.68 | 78.77 | 78.23 | 79.79 | 80.04 | 79.91 | 74.24 | 78.49 | 76.36 |
| 8 | $T_8$ | (900 ml + 20 g)/ha | (45 + 4) g/ha | 60.40 | 60.53 | 60.47 | 59.44 | 56.64 | 58.04 | 59.21 | 55.96 | 57.58 | 57.89 | 55.11 | 56.50 |
| 9 | $T_9$ | (250 g + 20 g)/ha | (175 + 4) g/ha | 51.02 | 52.31 | 51.66 | 51.22 | 51.93 | 51.58 | 52.61 | 52.77 | 52.69 | 53.44 | 52.73 | 53.09 |
| 10 | $T_{10}$ | (900 ml + 800 g)/ha | (45 + 400) g/ha | 73.29 | 73.44 | 73.36 | 72.12 | 68.72 | 70.42 | 71.84 | 67.90 | 69.87 | 70.24 | 66.88 | 68.56 |
| 11 | $T_{11}$ | (300 g + 1000 g)/ha | (175 + 400) g/ha | 72.11 | 73.92 | 73.01 | 72.38 | 73.39 | 72.89 | 74.35 | 74.58 | 74.46 | 75.53 | 74.52 | 75.03 |
| 12 | $T_{12}$ | — | — | — | — | — | — | — | — | — | — | — | — | — | — |

DAHA: Days after herbicide application;
GZ: Ghaziabad;
SP: Sonipat;
PL: Pooled

TABLE 9

Effect of treatment (Pinoxaden + Metribuzin + Metsulfuron-methyl/Isoproturon) on WCE against *Avena ludoviciana*

| S. | Treat- | Dose | | 15 DAHA | | | 30 DAHA | | | 45 DAHA | | | 60 DAHA | | |
|---|---|---|---|---|---|---|---|---|---|---|---|---|---|---|---|
| No. | ments | Formulation | a.i. | GZ | SP | PL | GZ | SP | PI | GZ | SP | PL | GZ | SP | PL |
| 1 | $T_1$ | 1000 g/ha | (45 + 175 + 4) g/ha | 89.67 | 89.44 | 89.56 | 90.28 | 89.85 | 90.07 | 92.55 | 91.63 | 92.09 | 91.47 | 90.92 | 91.20 |
| 2 | $T_2$ | 1000 g/ha | (45 + 175 + 400) g/ha | 95.96 | 95.72 | 95.84 | 96.61 | 96.16 | 96.38 | 98.84 | 98.05 | 98.45 | 97.88 | 97.29 | 97.59 |
| 3 | $T_3$ | 900 ml/ha | 45 g/ha | 58.07 | 59.00 | 58.54 | 59.81 | 59.34 | 59.57 | 61.43 | 60.63 | 61.03 | 58.92 | 60.03 | 59.47 |
| 4 | $T_4$ | 250 g/ha | 175 g/ha | 56.43 | 56.38 | 56.41 | 56.90 | 57.08 | 56.99 | 60.69 | 59.86 | 60.28 | 46.19 | 58.69 | 52.44 |
| 5 | $T_5$ | 20 g/ha | 4 g/ha | 17.89 | 17.83 | 17.86 | 18.00 | 17.92 | 17.96 | 18.55 | 18.32 | 18.43 | 18.18 | 18.17 | 18.17 |
| 6 | $T_6$ | 800 g/ha | 400 g/ha | 50.62 | 50.45 | 50.53 | 50.95 | 50.70 | 50.83 | 52.49 | 51.85 | 52.17 | 51.44 | 51.41 | 51.42 |

TABLE 9-continued

Effect of treatment (Pinoxaden + Metribuzin + Metsulfuron-methyl/Isoproturon) on WCE against *Avena ludoviciana*

| S. No. | Treat-ments | Dose Formulation | Dose a.i. | 15 DAHA GZ | 15 DAHA SP | 15 DAHA PL | 30 DAHA GZ | 30 DAHA SP | 30 DAHA PI | 45 DAHA GZ | 45 DAHA SP | 45 DAHA PL | 60 DAHA GZ | 60 DAHA SP | 60 DAHA PL |
|---|---|---|---|---|---|---|---|---|---|---|---|---|---|---|---|
| 7 | $T_7$ | (900 ml + 250 g)/ha | (45 + 175) g/ha | 78.97 | 80.65 | 79.81 | 79.75 | 81.17 | 80.46 | 82.22 | 83.18 | 82.70 | 76.72 | 80.87 | 78.80 |
| 8 | $T_8$ | (900 ml + 20 g)/ha | (45 + 4) g/ha | 61.67 | 61.58 | 61.62 | 60.46 | 58.36 | 59.41 | 60.97 | 58.26 | 59.62 | 59.73 | 56.89 | 58.31 |
| 9 | $T_9$ | (250 g + 20g)/ha | (175 + 4) g/ha | 52.31 | 53.42 | 52.87 | 52.83 | 53.77 | 53.30 | 54.46 | 55.10 | 54.78 | 55.48 | 54.59 | 55.03 |
| 10 | $T_{10}$ | (900 ml + 800 g)/ha | (45 + 400) g/ha | 74.75 | 74.65 | 74.70 | 73.28 | 70.73 | 72.01 | 73.91 | 70.62 | 72.26 | 72.40 | 68.95 | 70.68 |
| 11 | $T_{11}$ | (300 g + 1000 g)/ha | (175 + 400) g/ha | 73.89 | 75.45 | 74.67 | 74.61 | 75.95 | 75.28 | 76.91 | 77.82 | 77.37 | 75.64 | 74.43 | 75.03 |
| 12 | $T_{12}$ | — | — | — | — | — | — | — | — | — | — | — | — | — | — |

DAHA: Days after herbicide application;
GZ: Ghaziabad;
SP: Sonipat;
PL: Pooled

TABLE 10

Effect of treatment (Pinoxaden + Metribuzin + Metsulfuron-methyl/Isoproturon) on WCE against *Chenopodium album*

| S. No. | Treat-ments | Dose Formulation | Dose a.i. | 15 DAHA GZ | 15 DAHA SP | 15 DAHA PL | 30 DAHA GZ | 30 DAHA SP | 30 DAHA PL | 45 DAHA GZ | 45 DAHA SP | 45 DAHA PL | 60 DAHA GZ | 60 DAHA SP | 60 DAHA PL |
|---|---|---|---|---|---|---|---|---|---|---|---|---|---|---|---|
| 1 | $T_1$ | 1000 g/ha | (45 + 175 + 4) g/ha | 77.16 | 74.13 | 75.64 | 78.70 | 75.57 | 77.14 | 79.52 | 79.32 | 79.42 | 77.70 | 75.96 | 76.83 |
| 2 | $T_2$ | 1000 g/ha | (45 + 175 + 400) g/ha | 68.01 | 65.35 | 66.68 | 69.37 | 66.62 | 67.99 | 70.09 | 69.91 | 70.00 | 68.49 | 66.95 | 67.72 |
| 3 | $T_3$ | 900 ml/ha | 45 g/ha | 13.95 | 15.03 | 14.49 | 11.75 | 15.29 | 13.52 | 12.29 | 16.24 | 14.27 | 11.30 | 15.48 | 13.39 |
| 4 | $T_4$ | 250 g/ha | 175 g/ha | 42.51 | 49.26 | 45.88 | 49.85 | 50.01 | 49.93 | 50.60 | 52.57 | 51.59 | 49.14 | 50.59 | 49.87 |
| 5 | $T_5$ | 20 g/ha | 4 g/ha | 32.78 | 33.26 | 33.02 | 34.32 | 33.84 | 34.08 | 36.17 | 35.95 | 36.06 | 35.18 | 34.25 | 34.72 |
| 6 | $T_6$ | 800 g/ha | 400 g/ha | 7.25 | 7.35 | 7.30 | 7.58 | 7.48 | 7.53 | 7.97 | 7.92 | 7.94 | 7.76 | 7.56 | 7.66 |
| 7 | $T_7$ | (900 ml + 250 g)/ha | (45 + 175) g/ha | 50.23 | 54.73 | 52.48 | 53.32 | 55.51 | 54.41 | 54.05 | 58.37 | 56.21 | 52.53 | 56.12 | 54.32 |
| 8 | $T_8$ | (900 ml + 20 g)/ha | (45 + 4) g/ha | 42.14 | 36.74 | 39.44 | 43.31 | 37.32 | 40.31 | 39.89 | 39.44 | 39.66 | 38.84 | 37.71 | 38.27 |
| 9 | $T_9$ | (250 g + 20g)/ha | (175 + 4) g/ha | 57.41 | 62.84 | 60.12 | 64.67 | 63.75 | 64.21 | 65.58 | 67.14 | 66.36 | 63.69 | 64.47 | 64.08 |
| 10 | $T_{10}$ | (900 ml + 800 g)/ha | (45 + 400) g/ha | 16.15 | 13.19 | 14.67 | 15.50 | 13.39 | 14.45 | 14.29 | 14.14 | 14.22 | 13.92 | 13.53 | 13.73 |
| 11 | $T_{11}$ | (300 g + 1000 g)/ha | (175 + 400) g/ha | 49.75 | 50.80 | 50.28 | 52.27 | 51.54 | 51.90 | 53.00 | 54.24 | 53.62 | 51.48 | 52.11 | 51.80 |
| 12 | $T_{12}$ | — | — | — | — | — | — | — | — | — | — | — | — | — | — |

DAHA: Days after herbicide application;
GZ: Ghaziabad;
SP: Sonipat;
PL: Pooled

TABLE 11

Effect of treatment (Pinoxaden + Metribuzin + Metsulfuron-methyl/Isoproturon) on WCE against *Melilotus* sp.

| S. No. | Treat-ments | Dose Formulation | Dose a.i. | 15 DAHA GZ | 15 DAHA SP | 15 DAHA PL | 30 DAHA GZ | 30 DAHA SP | 30 DAHA PL | 45 DAHA GZ | 45 DAHA SP | 45 DAHA PL | 60 DAHA GZ | 60 DAHA SP | 60 DAHA PL |
|---|---|---|---|---|---|---|---|---|---|---|---|---|---|---|---|
| 1 | $T_1$ | 1000 g/ha | (45 + 175 + 4) g/ha | 82.72 | 84.75 | 83.74 | 84.81 | 85.73 | 85.27 | 85.16 | 86.54 | 85.85 | 81.55 | 83.12 | 82.33 |
| 2 | $T_2$ | 1000 g/ha | (45 + 175 + 400) g/ha | 72.45 | 74.22 | 73.33 | 74.27 | 75.07 | 74.67 | 74.58 | 75.79 | 75.19 | 71.42 | 72.79 | 72.11 |
| 3 | $T_3$ | 900 ml/ha | 45 g/ha | 14.26 | 14.76 | 14.51 | 15.24 | 15.27 | 15.25 | 15.41 | 15.64 | 15.52 | 14.55 | 14.82 | 14.69 |

TABLE 11-continued

Effect of treatment (Pinoxaden + Metribuzin + Metsulfuron-methyl/Isoproturon) on WCE against *Melilotus* sp.

| S. | Treat- | Dose | | 15 DAHA | | | 30 DAHA | | | 45 DAHA | | | 60 DAHA | | |
|---|---|---|---|---|---|---|---|---|---|---|---|---|---|---|---|
| No. | ments | Formulation | a.i. | GZ | SP | PL | GZ | SP | PL | GZ | SP | PL | GZ | SP | PL |
| 4 | $T_4$ | 250 g/ha | 175 g/ha | 54.02 | 55.03 | 54.52 | 55.74 | 55.91 | 55.83 | 56.05 | 56.56 | 56.30 | 53.58 | 54.21 | 53.90 |
| 5 | $T_5$ | 20 g/ha | 4 g/ha | 38.61 | 39.49 | 39.05 | 39.80 | 40.37 | 40.08 | 40.00 | 40.61 | 40.30 | 37.97 | 38.70 | 38.34 |
| 6 | $T_6$ | 800 g/ha | 400 g/ha | 8.44 | 8.63 | 8.53 | 8.69 | 8.81 | 8.75 | 8.73 | 8.86 | 8.80 | 8.31 | 8.46 | 8.38 |
| 7 | $T_7$ | (900 ml + 250 g)/ha | (45 + 175) g/ha | 59.11 | 61.61 | 60.36 | 61.11 | 62.60 | 61.86 | 61.46 | 63.05 | 62.26 | 58.67 | 60.40 | 59.53 |
| 8 | $T_8$ | (900 ml + 20 g)/ha | (45 + 4) g/ha | 45.95 | 46.67 | 46.31 | 44.91 | 45.50 | 45.20 | 43.10 | 42.71 | 42.90 | 42.74 | 40.77 | 41.75 |
| 9 | $T_9$ | (250 g + 20g)/ha | (175 + 4) g/ha | 67.53 | 70.46 | 68.99 | 69.87 | 71.63 | 70.75 | 70.28 | 72.15 | 71.21 | 67.01 | 69.03 | 68.02 |
| 10 | $T_{10}$ | (900 ml + 800 g)/ha | (45 + 400) g/ha | 16.40 | 16.65 | 16.52 | 16.03 | 16.24 | 16.14 | 15.39 | 15.25 | 15.32 | 15.26 | 14.57 | 14.92 |
| 11 | $T_{11}$ | (300 g + 1000 g)/ha | (175 + 400) g/ha | 54.49 | 56.82 | 55.66 | 56.35 | 57.76 | 57.06 | 56.68 | 58.18 | 57.43 | 54.06 | 55.69 | 54.88 |
| 12 | $T_{12}$ | — | — | — | — | — | — | — | — | — | — | — | — | — | — |

DAHA: Days after herbicide application;
GZ: Ghaziabad;
SP: Sonipat;
PL: Pooled

TABLE 12

Effect of treatments on grain yield of wheat crop at harvest

| S. | Treat- | Dose | | Grain yield (kg/ha) | | | % increase against |
|---|---|---|---|---|---|---|---|
| No. | ments | Formulation | a.i. | Ghaziabad | Sonipat | Mean | control |
| 1 | $T_1$ | 1000 g/ha | (45 + 175 + 4) g/ha | 5244 | 5498 | 5371 | 85.85 |
| 2 | $T_2$ | 1000 g/ha | (45 + 175 + 400) g/ha | 5048 | 5290 | 5169 | 78.86 |
| 3 | $T_3$ | 900 ml/ha | 45 g/ha | 3921 | 4045 | 3983 | 37.82 |
| 4 | $T_4$ | 250 g/ha | 175 g/ha | 4003 | 4129 | 4066 | 40.69 |
| 5 | $T_5$ | 20 g/ha | 4 g/ha | 3625 | 3741 | 3683 | 27.44 |
| 6 | $T_6$ | 800 g/ha | 400 g/ha | 3319 | 3425 | 3372 | 16.68 |
| 7 | $T_7$ | (900 ml + 250 g)/ha | (45 + 175) g/ha | 4368 | 4542 | 4455 | 54.15 |
| 8 | $T_8$ | (900 ml + 20 g)/ha | (45 + 4) g/ha | 4193 | 4361 | 4277 | 47.99 |
| 9 | $T_9$ | (250 g + 20g)/ha | (175 + 4) g/ha | 4252 | 4422 | 4337 | 50.07 |
| 10 | $T_{10}$ | (900 ml + 800 g)/ha | (45 + 400) g/ha | 4171 | 4337 | 4254 | 47.20 |
| 11 | $T_{11}$ | (300 g + 1000 g)/ha | (175 + 400) g/ha | 4206 | 4376 | 4291 | 48.48 |
| 12 | $T_{12}$ | — | — | 2873 | 2907 | 2890 | — |
| | | SEM± | | 49.957 | 54.438 | 52.228 | 49.957 |
| | | CD5% | | 147.464 | 160.691 | 154.167 | 147.464 |

SEM±: Standard error of mean
CD5%: Critical Difference

Evaluation of Synergistic Effect

A synergistic effect exists whenever the action of an active ingredient combination is greater than the sum of the actions of the individual components. Synergism was calculated by using Colby's method, Weeds, vol. 15 No. 1 (January 1967), pp. 20-2.

The synergistic action expected for a given combination of three active components can be calculated as follows:

$$E = (X + Y + Z) - \frac{(XY + YZ + XZ)}{100} + \frac{XYZ}{10000}$$

Where:

E represents expected percentage of control for the combination of the three active ingredients at defined doses (for example equal to x, y and z respectively), X is the percentage of control observed by the compound (I) at a defined dose (equal to x), Y is the percentage of control observed by the compound (II) at a defined dose (equal to y), Z is the percentage of control observed by the compound (III) at a defined dose (equal to z).

If observed control of the combination>Expected control, the combination is synergistic If observed control of the combination<Expected control, the combination is antagonistic If observed control of the combination=Expected control, the combination is additive

TABLE 13

Synergistic effect of Pinoxaden + Metribuzin + Metsulfuron-methyl/Isoproturon composition against *Phalaris minor* and *Avena ludoviciana*

| S. No. | Treatment | Dose/ha | Dose (a.i./ha) | WCE(%) at 60 DAHA against *Phalaris minor* Pooled | WCE(%) expected (using Colby's formula) | WCE(%) at 60 DAHA against *Avena ludoviciana* Pooled | WCE(%) expected (using Colby's formula) |
|---|---|---|---|---|---|---|---|
| 1 | $T_1$- Pinoxaden 4.5% + Metribuzin 17.5% + Metsulfuron-methyl 0.4% WP | 1000 g/ha | (45 + 175 + 4) g/ha | 90.5 | 82.10 | 91.2 | 84.23 |
| 2 | $T_2$- Pinoxaden 4.5% + Metribuzin 17.5% + Isoproturon 40% WP | 1000 g/ha | (45 + 175 + 400) g/ha | 94.58 | 88.76 | 97.59 | 90.64 |
| 3 | $T_3$- Pinoxaden 5.1% EC | 900 ml/ha | 45 g/ha | 57.49 | | 59.47 | |
| 4 | $T_4$- Metribuzin 70% WP | 250 g/ha | 175 g/ha | 48.98 | | 52.44 | |
| 5 | $T_5$- Metsulfuron Methyl 20% WP | 20 g/ha | 4 g/ha | 17.45 | | 18.17 | |
| 6 | $T_6$- Isoproturon 50% WP | 800 g/ha | 400 g/ha | 48.18 | | 51.42 | |
| 7 | $T_7$-Pinoxaden 5.1% EC + Metribuzin 70% WP | (900 ml + 250 g)/ha | (45 + 175) g/ha | 76.36 | 78.31 | 78.80 | 80.72 |
| 8 | $T_8$-Pinoxaden 5.1% EC + Metsulfuron Methyl 20% WP | (900 ml + 20 g)/ha | (45 + 4) g/ha | 56.50 | 64.91 | 58.31 | 66.83 |
| 9 | $T_9$-Metribuzin 70% WP + Metsulfuron Methyl 20% WP | (250 g + 20 g)/ha | (175 + 4) g/ha | 53.09 | 57.88 | 55.03 | 61.08 |
| 10 | $T_{10}$-Pinoxaden 5.1% EC + Isoproturon 50% WP | (900 ml + 800 g)/ha | (45 + 400) g/ha | 68.56 | 77.97 | 70.68 | 80.31 |
| 11 | $T_{11}$-Metribuzin 70% WP + Isoproturon 50% WP | (300 g + 1000 g)/ha | (175 + 400) g/ha | 75.03 | 73.56 | 75.03 | 76.90 |

TABLE 14

Synergistic effect of Pinoxaden + Metribuzin + Metsulfuron-methyl/Isoproturon composition against *Chenopodium album* and *Melilotus* sp.

| S. No. | Treatment | Dose/ha | Dose (a.i./ha) | WCE(%) at 60 DAHA against *Chenopodium album* Pooled | WCE(%) expected (using Colby's formula) | WCE(%) at 60 DAHA against *Melilotus* sp. Pooled | WCE(%) expected (using Colby's formula) |
|---|---|---|---|---|---|---|---|
| 1 | $T_1$-Pinoxaden 4.5% + Metribuzin 17.5% + Metsulfuron-methyl 0.4% WP | 1000 g/ha | (45 + 175 + 4) g/ha | 76.83 | 71.66 | 82.33 | 75.75 |
| 2 | $T_2$-Pinoxaden 4.5% + Metribuzin 17.5% + Isoproturon 40% WP | 1000 g/ha | (45 + 175 + 400) g/ha | 67.72 | 59.91 | 72.11 | 63.97 |
| 3 | $T_3$-Pinoxaden 5.1% EC | 900 ml/ha | 45 g/ha | 13.39 | | 14.69 | |
| 4 | $T_4$-Metribuzin 70% WP | 250 g/ha | 175 g/ha | 49.87 | | 53.90 | |
| 5 | $T_5$-Metsulfuron Methyl 20% WP | 20 g/ha | 4 g/ha | 34.72 | | 38.34 | |
| 6 | $T_6$-Isoproturon 50% WP | 800 g/ha | 400 g/ha | 7.66 | | 8.38 | |
| 7 | $T_7$-Pinoxaden 5.1% EC + Metribuzin 70% WP | (900 ml + 250 g)/ha | (45 + 175) g/ha | 54.32 | 56.58 | 59.53 | 60.67 |
| 8 | $T_8$-Pinoxaden 5.1% EC + Metsulfuron Methyl 20% WP | (900 ml + 20 g)/ha | (45 + 4) g/ha | 38.27 | 43.46 | 41.75 | 47.40 |
| 9 | $T_9$-Metribuzin 70% WP + Metsulfuron Methyl 20% WP | (250 g + 20 g)/ha | (175 + 4) g/ha | 64.08 | 67.28 | 68.02 | 71.57 |
| 10 | $T_{10}$-Pinoxaden 5.1% EC + Isoproturon 50% WP | (900 ml + 800 g)/ha | (45 + 400) g/ha | 13.73 | 20.02 | 14.92 | 21.84 |
| 11 | $T_{11}$-Metribuzin 70% WP + Isoproturon 50% WP | (300 g + 1000 g)/ha | (175 + 400) g/ha | 51.80 | 53.71 | 54.88 | 57.76 |

It is evident from the above tables that the herbicidal composition of the present invention gave good control of weeds/undesired vegetation and higher yield as compared to the reference products (solo or binary composition). Further, the composition of present invention is synergistic.

Phytotoxicity Observations

For phytotoxicity evaluation on wheat crop, following observations were made by observing temporary or long lasting damage to the leaves if any viz., leaf injury on tips and leaf surface, wilting, vein clearing, necrosis, epinasty and hyponasty at 15, 30, 45, 60 DAHA.

TABLE 15

Phytotoxic effect of the synergistic composition of the present invention on wheat crop

| S. | | | Epinasty | | Hyponasty | | Necrosis | | Vein clearing | | Wilting | |
|---|---|---|---|---|---|---|---|---|---|---|---|---|
| No. | Treatments | Dose/ha | GZ | SP | GZ | SP | GZ | SP | GZ | SP | GZ | SP |
| 1 | $T_1$- Pinoxaden 4.5% + Metribuzin 17.5% + Metsulfuron-methyl 0.4% WP | 1000 g | 0 | 0 | 0 | 0 | 0 | 0 | 0 | 0 | 0 | 0 |
| 2 | $T_2$- Pinoxaden 4.5% + Metribuzin 17.5% + Metsulfuron-methyl 0.4% WP | 1500 g | 0 | 0 | 0 | 0 | 0 | 0 | 0 | 0 | 0 | 0 |
| 3 | $T_3$- Pinoxaden 4.5% + Metribuzin 17.5% + Metsulfuron-methyl | 2000 g | 0 | 0 | 0 | 0 | 0 | 0 | 0 | 0 | 0 | 0 |

TABLE 15-continued

Phytotoxic effect of the synergistic composition of the present invention on wheat crop

| S. No. | Treatments | Dose/ha | Epinasty GZ | Epinasty SP | Hyponasty GZ | Hyponasty SP | Necrosis GZ | Necrosis SP | Vein clearing GZ | Vein clearing SP | Wilting GZ | Wilting SP |
|---|---|---|---|---|---|---|---|---|---|---|---|---|
| | 0.4% WP | | | | | | | | | | | |
| 4 | $T_4$- Pinoxaden 4.5% + Metribuzin 17.5% + Metsulfuron-methyl 0.4% WP | 3000 g | 0 | 0 | 0 | 0 | 0 | 0 | 0 | 0 | 0 | 0 |
| 5 | $T_5$- Pinoxaden 4.5% + Metribuzin 17.5% + Isoproturon 40% WP | 1000 g | 0 | 0 | 0 | 0 | 0 | 0 | 0 | 0 | 0 | 0 |
| 6 | $T_6$- Pinoxaden 4.5% + Metribuzin 17.5% + Isoproturon 40% WP | 1500 g | 0 | 0 | 0 | 0 | 0 | 0 | 0 | 0 | 0 | 0 |
| 7 | $T_7$- Pinoxaden 4.5% + Metribuzin 17.5% + Isoproturon 40% WP | 2000 g | 0 | 0 | 0 | 0 | 0 | 0 | 0 | 0 | 0 | 0 |
| 8 | $T_8$- Pinoxaden 4.5% + Metribuzin 17.5% + Isoproturon 40% WP | 3000 g | 0 | 0 | 0 | 0 | 0 | 0 | 0 | 0 | 0 | 0 |
| 9 | $T_9$- Control | — | 0 | 0 | 0 | 0 | 0 | 0 | 0 | 0 | 0 | 0 |

GZ: Ghaziabad;
SP: Sonipat
0-No Phyto-toxicity
10-Complete kill the plant

From the foregoing it will be observed that numerous modifications and variations can be effectuated without departing from the true spirit and scope of the novel concepts of the present invention. It is to be understood that no limitations with respect to the specific embodiments illustrated is intended or should be inferred. It should be understood that all such modifications and improvements have been deleted herein for the sake of conciseness and readability but are properly within the scope of the following claims.

We claim:

1. A synergistic herbicidal composition consisting of:
pinoxaden in an amount of 1% to 10% w/w/;
metribuzin in an amount of 5% to 20% w/w;
at least one herbicide compound selected from the group consisting of isoproturon and metsulfuron methyl in an amount of 0.1% to 60% w/w; and
one or more excipients.

2. The composition as claimed in claim 1, wherein:
isoproturon is preferably present in an amount of 10% to 60% w/w; and
metsulfuron methyl is present in an amount of 0.1% to 45% w/w.

3. The composition as claimed in claim 1, wherein the composition is selected from a group consisting of:
pinoxaden present in an amount of 4.5% w/w, metribuzin present in an amount of 17.5% w/w, and isoproturon present in an amount of 40% w/w, and one or more excipients; and
pinoxaden present in an amount of 4.5% w/w, metribuzin present in an amount of 17.5% w/w, and metsulfuron methyl present in an amount of 0.4% w/w, and one or more excipients.

4. The composition as claimed in claim 1, wherein the composition is formulated as a capsule suspension (CS), a dispersible concentrate (DC), a dustable powder (DP), a powder for dry seed treatment (DS), an emulsifiable concentrate (EC), an emulsifiable granule (EG), an emulsion water-in-oil (EO), an emulsifiable powder (EP), an emulsion for seed treatment (ES), an emulsion oil-in-water (EW), a flowable concentrate for seed treatment (FS), granules (GR), a micro-emulsion (ME), an oil-dispersion (OD), an oil miscible flowable concentrate (OF), an oil miscible liquid (OL), an oil dispersible powder (OP), a suspension concentrate (SC), a suspension concentrate for direct application (SD), a suspo-emulsion (SE), a water soluble granule (SG), a soluble concentrate (SL), a spreading oil (SO), a water soluble powder (SP), a water soluble tablet (ST), an ultra-low volume (ULV) suspension, a tablet (TB), an ultra-low volume (ULV) liquid, a water dispersible granules (WG), a wettable powder (WP), a water dispersible powder for slurry seed treatment (WS), a water dispersible tablet (WT), a mixed formulation of CS and SC (ZC), a mixed formulation of CS and SE (ZE), or a mixed formulation of CS and EW (ZW).

5. The composition as claimed in claim 4, wherein the composition is formulated as WP or WG.

6. The composition as claimed in claim 1, wherein the excipient is selected from the group consisting of:
a dispersing agent present in an amount of 1% to 10% w/w;
a wetting agent present in an amount of 1% to 10% w/w;
a disintegrating agent present in an amount of 1% to 10% w/w;
a defoamer agent present in an amount of 0.1% to 5% w/w; and
a filler present in a sufficient amount.

7. The composition as claimed in claim 6, wherein:
the dispersing agent is selected from the group consisting of sodium salt of naphthalene sulphonate condensate, sulfonated aromatic polymer sodium salt, sodium polycarboxylate, ethanesulfonic acid 2-[methyl [(9Z)-1-oxo-9-octadecenyl]amino]-sodium salt, sodium 2-(methyloleoylamino) ethane-1-sulphonate, amine salt of phosphate tristyryl phenol ethoxylated, acrylic copolymer, graft copolymer, salt of naphthalene sulphonate, naphthalene sulfonate formaldehyde condensate, phosphate ester, salt of polycarboxylate, alcohol block copolymer, ethoxylated polyarylphenol phosphate ester, and a combination thereof;

the wetting agent is selected from the group consisting of sodium lauryl sulphate, sodium alkyl naphthalene sulfonate blend, sodium alkylnaphthalenesulfonate, sodium isopropyl naphthalene sulfonate, sodium dioctylsulfosuccinate, ethoxylated polyarylphenol phosphate ester, dioctyl sulphosuccinate, non-ionic ethoxylate, and a combination thereof;

the disintegrating agent is selected from the group consisting of sodium sulphate, ammonium sulphate, sodium bicarbonate, lactose, and a combination thereof;

the defoamer is selected from the group consisting of silicon emulsion, dimethyl polysiloxane emulsion, polysiloxane emulsion, and a combination thereof; and the filler is selected from the group consisting of silica, china clay, and a combination thereof.

8. The composition as claimed in claim 2, wherein:

isoproturon is present in an amount of 40% to 60% w/w; and metsulfuron methyl is present in an amount of 0.1% to 2% w/w.

* * * * *